United States Patent
Noh et al.

(10) Patent No.: US 12,474,730 B2
(45) Date of Patent: Nov. 18, 2025

(54) DESERIALIZER AND MEMORY MODULE INCLUDING THE SAME

(71) Applicant: SAMSUNG ELECTRONICS CO., LTD., Suwon-si (KR)

(72) Inventors: Taegun Noh, Suwon-si (KR); Seunghyun Oh, Suwon-si (KR); Baekmin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 18/418,856

(22) Filed: Jan. 22, 2024

(65) Prior Publication Data

US 2024/0338049 A1    Oct. 10, 2024

(30) Foreign Application Priority Data

Apr. 5, 2023    (KR) .................. 10-2023-0044974
Jun. 20, 2023   (KR) .................. 10-2023-0078804

(51) Int. Cl.
  *G06F 11/00* (2006.01)
  *G06F 1/04* (2006.01)

(52) U.S. Cl.
  CPC ..................... *G06F 1/04* (2013.01)

(58) Field of Classification Search
  None
  See application file for complete search history.

(56) References Cited

U.S. PATENT DOCUMENTS

| | | | |
|---|---|---|---|
| 6,260,167 B1 * | 7/2001 | Lo | H04L 43/50 714/744 |
| 6,862,296 B1 * | 3/2005 | Desai | H04L 7/042 341/100 |
| 7,253,754 B2 | 8/2007 | Takeuchi et al. | |
| 7,463,171 B2 | 12/2008 | Baba | |
| 7,626,523 B2 | 12/2009 | Shin et al. | |
| 7,990,293 B2 | 8/2011 | Luo | |
| 8,619,762 B2 | 12/2013 | Lee et al. | |
| 8,823,426 B2 | 9/2014 | Song | |
| 9,240,804 B2 | 1/2016 | Wortman et al. | |
| 9,378,321 B2 * | 6/2016 | Hosny | G06F 30/392 |
| 9,680,501 B1 | 6/2017 | Li | |

(Continued)

FOREIGN PATENT DOCUMENTS

KR    10-0894811    4/2009
KR    10-1914297    10/2018

*Primary Examiner* — Hyun Nam
(74) *Attorney, Agent, or Firm* — MORGAN, LEWIS & BOCKIUS LLP (57) ABSTRACT

A deserializer includes a shift register circuit that outputs N output data by shifting input data based on a first clock signal, a clock divider that outputs N second clock signals N-divided from the first clock signal and having N phases different from each other, and outputs one or more third clock signal divided to have a frequency less than that of the second clock signals, a clock selecting circuit that outputs a selected clock signal having an edge corresponding to a second time after N number of clock cycles of the first clock signal have elapsed from a first time at which a valid period is detected in a selection signal for selecting the input data based on the N second clock signals and the one or more third clock signals, and a data align circuit that parallelizes the N output data based on the selected clock signal.

20 Claims, 9 Drawing Sheets

(56) References Cited

U.S. PATENT DOCUMENTS

| | | | |
|---|---|---|---|
| 2013/0083611 A1* | 4/2013 | Ware | G06F 3/0625 |
| | | | 365/191 |
| 2015/0143316 A1* | 5/2015 | Hosny | G06F 30/392 |
| | | | 716/113 |
| 2015/0280898 A1* | 10/2015 | Chowdhary | H04L 7/0331 |
| | | | 375/355 |
| 2023/0378962 A1* | 11/2023 | Tierno | H04L 7/033 |
| 2024/0338049 A1* | 10/2024 | Noh | G11C 7/222 |

\* cited by examiner

DESERIALIZER AND MEMORY MODULE INCLUDING THE SAME

CROSS-REFERENCE TO RELATED APPLICATIONS

This patent application claims priority under 35 U.S.C. § 119 to Korean Patent Application Nos. 10-2023-0044974 filed on Apr. 5, 2023, and 10-2023-0078804 filed on Jun. 20, 2023, respectively, in the Korean Intellectual Property Office, the disclosures of which are incorporated by reference in their entireties herein.

1. TECHNICAL FIELD

Embodiments of the present disclosure described herein relate to a deserializer and a memory module including the same.

2. DISCUSSION OF RELATED ART

A deserializer refers to a circuit that converts serial data into parallel data. The deserializer may convert the serial data into parallel data using a certain clock signal. For example, the deserializer may determine a parallelized position of the serial data depending on which phase of the clock signal the serial data is positioned. However, since it can be difficult to identify the clock signal, there is no guarantee that the parallel data will be output properly.

SUMMARY

At least one embodiment of the present disclosure provides a deserializer capable of sequentially parallelizing valid data and a memory module including the same.

According to an embodiment of the present disclosure, a deserializer includes a shift register circuit, a clock divider, a clock selecting circuit, and a data align circuit. The shift register circuit outputs N output data by shifting input data based on a first clock signal, where N' is a natural number. The clock divider outputs N second clock signals N-divided from the first clock signal and having N phases different from each other, and outputs one or more third clock signals divided to have a frequency less than that of the second clock signals. The clock selecting circuit outputs a selected clock signal having an edge corresponding to a second time after N number of clock cycles the first clock signal have elapsed from a first time at which a valid period is detected in a selection signal for selecting the input data based on the N second clock signals and the one or more third clock signals. The data align circuit parallelizes the N output data based on the selected clock signal.

According to an embodiment of the present disclosure, a method of operating a deserializer includes: outputting N output data by shifting input data based on a first clock signal, where 'N' is a natural number; and parallelizing the N output data based on a selected clock signal. The selected clock signal is output to have an edge corresponding to a second time after N number of clock cycles of the first clock signal have elapsed from a first time at which a valid period is detected in a selection signal for selecting the input data, based on N second clock signals and one or more third clock signals. The N second clock signals are N-divided from the first clock signal and have N phases different from each other, and the one or more third clock signals are divided to have a frequency less than that of the second clock signals.

According to an embodiment of the present disclosure, a memory module is provided that includes a plurality of memory packages and a registered clock driver (RCD). The RCD is configured to receive input data and a first clock signal from a processor, to perform buffering on the input data to generate buffered data and to transfer the buffered data to the plurality of memory packages. The RCD includes a deserializer, a first logic circuit and a second logic circuit. The deserializer is configured to output a selected clock signal having an edge corresponding to a second time after N number of clock cycles of the first clock signal have elapsed from a first time at which a valid period is detected in a selection signal included in the input data, and to parallelize the input data based on the selected clock signal to output N parallel data. The first logic circuit is configured to perform the buffering on the input data. The second logic circuit is configured to perform the buffering on the N parallel data, where 'N' is a natural number.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure may be described in detail and clearly to such an extent that one of ordinary skill in the art may implement the present disclosure.

Figure 1:
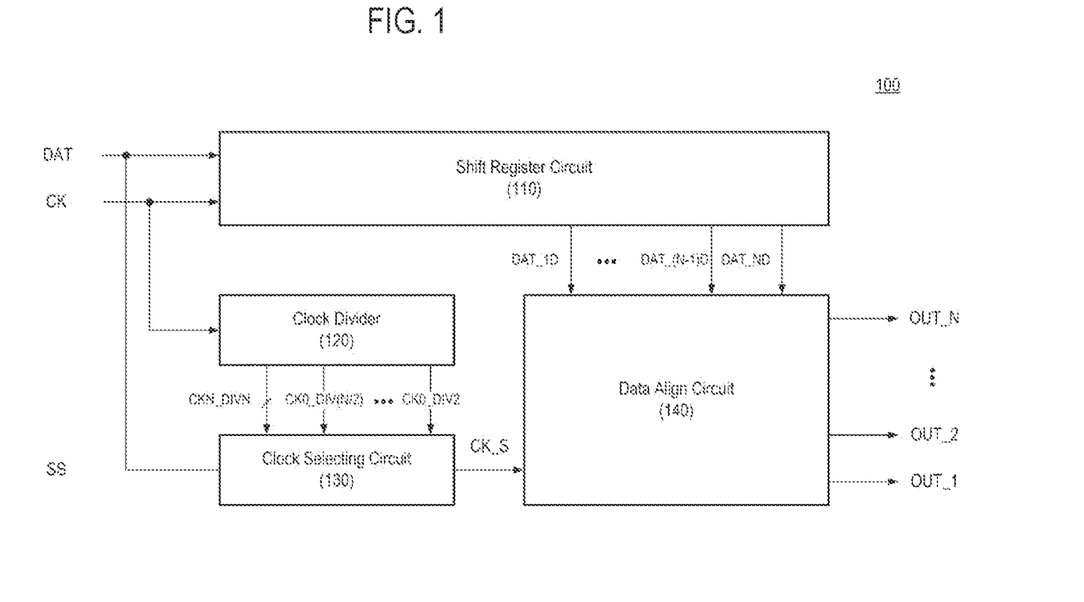
FIG. 1 illustrates a deserializer according to an embodiment of the present disclosure.

FIG. 1 illustrates a deserializer according to an embodiment of the present disclosure.

Referring to FIG. 1, a deserializer 100 according to an embodiment includes a shift register circuit 110, a clock divider 120 (e.g., a clock divider circuit), a clock selecting circuit 130, and a data align circuit 140.

The shift register circuit 110 may be configured to output N output data DAT_1D to DAT_ND by shifting input data DAT based on a first clock signal CK, where 'N' is a natural number greater than 0. Here, the shifting may refer to an operation of delaying the input data DAT in a time domain, according to the first clock signal CK. For example, the input data DAT may be serial data having a size of n bits, where 'n' is a natural number greater than 0. For example, command/address (CA) data provided from a processor and a selection signal SS for selecting the input data DAT may be included in the input data DAT. For example, if N=4, then the shift register circuit 110 would output first data, second data, third data, and fourth data.

The first clock signal CK may be a driving clock signal of the deserializer 100 or a device to which the deserializer 100 may be applied. For example, the shift register circuit 110 may store and shift the input data DAT at every edge of the first clock signal CK. In the present disclosure, the edge may be any one of a rising edge and a falling edge. For example, the shift register circuit 110 may store and shift the input data DAT at each rising edge or each falling edge of the first clock signal CK. Herein, whenever a rising edge is referenced, in an alternate embodiment, it may be replaced with a falling edge.

The output data DAT_1D to DAT_ND of the shift register circuit 110 may be shifted from the input data DAT. For example, the first output data DAT_1D to the N-th output data DAT_ND may be obtained by sequentially shifting the input data DAT by one clock cycle of the first clock signal CK.

The clock divider 120 may be configured to output a second clock signal CKN_DIVN and third clock signals CK0_DIV2 to CK0_DIV(N/2) to be used in the clock selecting circuit 130 from the first clock signal CK. The second clock signal CKN_DIVN may be N-divided from the first clock signal CK and may have N different phases. In detail, the clock divider 120 may divide the first clock signal CK by 'N' to generate N-divided clock signal and may shift the phases of the N-divided clock signals by 'N' to generate N second clock signals CKN_DIVN having N different phases. For example, assuming that the first clock signal CK has a phase of 0 degree, the clock divider 120 may shift the phases of N-divided clock signals having the phase of 0 degrees by 360/N degrees to generate N second clock signals CKN_DIVN. For example, if the first clock signal CK has a 60 Hz frequency, it may be divided into a 2-1 clock signal of 30 Hz having a phase of 0 degrees and a 2-2 clock signal of 30 Hz having a phase of 180 degrees.

The third clock signals CK0_DIV2 to CK0_DIV(N/2) may be the N second clock signals CKN_DIVN divided to have a smaller frequency than the second clock signal CKN_DIVN. For example, the one or more third clock signals CK0_DIV2 to CK0_DIV(N/2) may include clock signals obtained by dividing the first clock signal CK by 2 to a clock signal obtained by dividing the first clock signal CK by N/2. In detail, the one or more third clock signals CK0_DIV2 to CK0_DIV(N/2) may be generated by dividing the first clock signal CK by 2, generated by dividing the first clock signal CK by $N/(2^{(N-2)})$ (here, $N/(2^{(N-2)})$ is a number greater than 2), generated by dividing the first clock signal CK by $N/(2^{(N-3)})$, . . . , generated by dividing the first clock signal by N/2. The first clock signal CK may have a phase of 0 degrees. The clock divider 120 may generate the one or more third clock signals CK0_DIV2 to CK0_DIV(N/2) by dividing the first clock signal CK having a phase of 0 degrees from 2 to N/2.

Alternatively, according to an embodiment, the clock divider 120 may set an arbitrary phase to a phase of 0 degrees, and may generate the N second clock signals CKN_DIVN and the one or more third clock signals CK0_DIV2 to CK0_DIV(N/2) with the set phase set to 0 degrees.

The clock selecting circuit 130 may receive the N second clock signals CKN_DIVN and the one or more third clock signals CK0_DIV2 to CK0_DIV(N/2) from the clock divider 120 and may receive a selection signal SS transferred together with the input data DAT. For example, the selection signal SS may be transferred from the processor to the deserializer 100 together with the input data DAT.

The selection signal SS may be a signal for selecting the input data DAT. For example, the selection signal SS may be a Chip Select (CS) signal. The CS signal may have a logic value of '0' or '1'. The logic value of '0' or '1' may indicate that specific data corresponding to a period in which the corresponding logic value is output in the input data DAT is valid data. Hereinafter, a period in which a specific logic value of the selection signal SS for indicating that valid data starts in the input data DAT is output may be referred to as a valid period.

The clock selecting circuit 130 may be configured to output a selected clock signal CK_S to enable the data align circuit 140 to accurately align the valid data corresponding to the selection signal SS, based on the N second clock signals CKN_DIVN and the one or more third clock signals CK0_DIV2 to CK0_DIV(N/2).

The selected clock signal CK_S may be a clock signal having an edge corresponding to a second time after N number of the first clock signals CK have elapsed from a first time at which the valid period of the selection signal SS is detected. The first time may be a time at which the valid period ends (e.g., a time at which a falling edge appears when the valid period starts at a rising edge). The second time may be a time at which a sequential storing of N number of data including data corresponding to the valid period in the input data DAT ends in the shift register circuit 110.

The clock selecting circuit 130 may detect the first time based on the N second clock signals CKN_DIVN and the one or more third clock signals CK0_DIV2 to CK0_DIV(N/2). In addition, the clock selection signal SS may output the selected clock signals CK_S based on the detected first time. A detailed operation of the clock selecting circuit 130 including the output of the selected clock signals CK_S will be described below.

The data align circuit 140 may be configured to parallelize the N output data DAT_1D to DAT_ND based on the selected clock signal CK_S output from the clock selecting circuit 130. As described above, the selected clock signal CK_S is output to have an edge at the second time at which storing of N number of the valid data including the first valid data selected depending on the selection signal SS from the input data DAT ends in the shift register circuit 110. Therefore, when the data align circuit 140 parallelizes the N output data DAT_1D to DAT_ND based on the selected clock signals CK_S, the parallelized N parallel data OUT_1 to OUT_N which are sequentially aligned from the first valid data may be output.

According to the above-described embodiment, the deserializer 100 uses several divided clock signals (the second clock CKN_DIVN and the third clock signals CK0_DIV2 to CK0_DIV(N/2)) to detect a specific time (the first time) from the selection signal SS, and may parallelize the input data DAT by utilizing the selected clock CK_S having an edge at the second time in consideration of the detected specific time. In this case, the parallelized data is data sequentially aligned from the earliest valid data indicated by the selection signal SS from the input data DAT. Therefore, in this embodiment of the present disclosure, it is always possible to perform parallelization from the first valid data. Accordingly, additional circuits or functions for separately detecting valid data may be reduced to provide a deserializer with reduced complexity or area.

Figure 2:
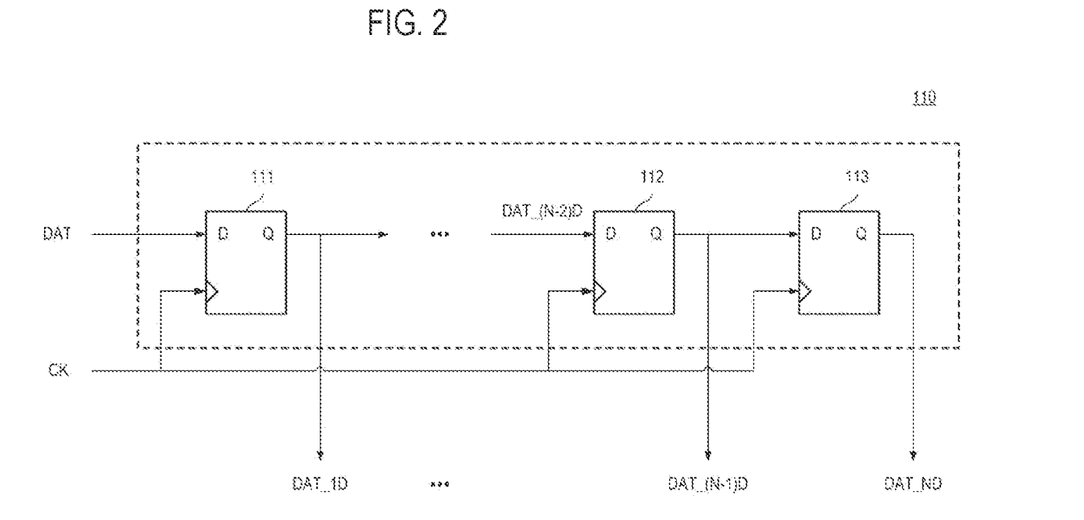
FIG. 2 illustrates a shift register circuit according to an embodiment.

FIG. 2 illustrates a shift register circuit according to an embodiment.

Referring to FIG. 2, the shift register circuit 110 according to an embodiment includes a plurality of flip-flops 111 to 113. In an embodiment, N number of flip-flops 111 to 113 may be provided. For example, the flip-flops 111 to 113 may be D-type flip-flops.

For example, when the shift register circuit 110 is implemented in a Serial-In to Parallel-Out (SIPO) structure, the input data DAT may be sequentially input to the plurality of flip-flops 111 to 113, and the output data DAT_1D to DAT_ND may be output in parallel from each of the plurality of flip-flops 111 to 113. The first clock signal CK is commonly applied to the plurality of flip-flops 111 to 113, and the plurality of flip-flops 111 to 113 may operate based on the first clock signals CK. For example, the first clock signal CK may be applied to clock terminals of the plurality of flip-flops 111 to 113.

Among the plurality of flip-flops 111 to 113, the first flip-flop 111 to which the input data DAT is first applied may output the input data DAT at an edge of the first clock signal CK. The first output data DAT_1D may be shifted by one clock cycle of the first clock signal CK from the input data DAT. Hereafter, when the (N−2)-th output data DAT_(N−2)D is input to the (N−1)-th flip-flop 112, the (N−1)-th flip-flop 112 may output the (N−1)-th output data DAT_(N−1)D shifted by one clock cycle of the first clock signal CK from the (N−2)-th output data DAT_(N−2)D. The N-th flip-flop 113 may receive the (N−1)-th output data DAT_(N−1)D, and may output the N-th output data DAT_ND shifted by one clock cycle of the first clock signal CK from the (N−1)-th output data DAT_(N−1)D.

The shift register circuit 110 according to an embodiment of the present disclosure is not limited to the implementation of FIG. 2 and may be implemented in various ways to store and shift the input data DAT.

Figure 3:
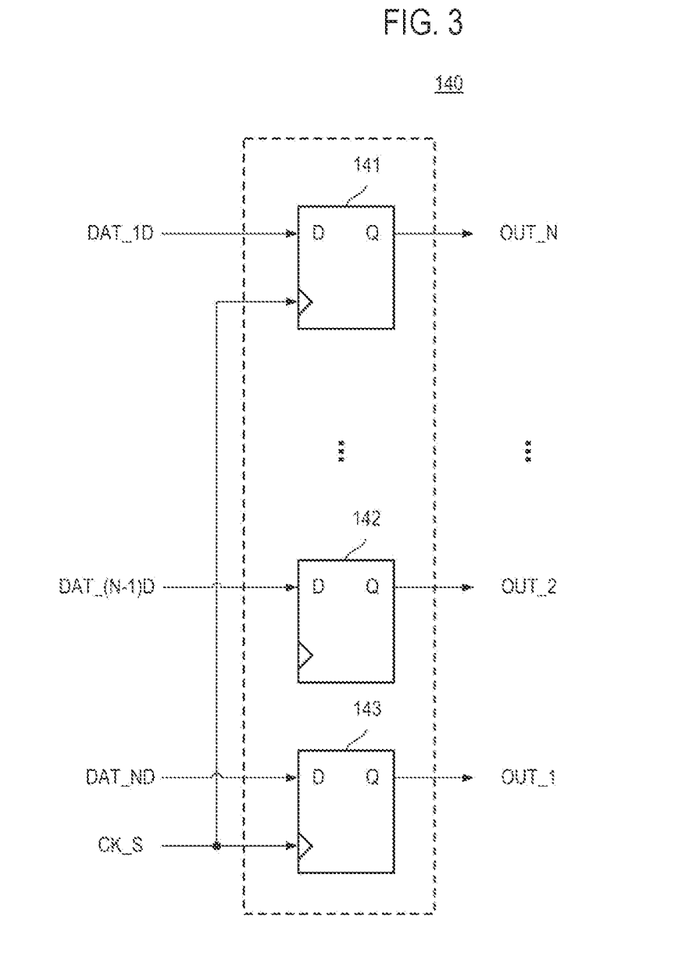
FIG. 3 illustrates a data align circuit according to an embodiment.

FIG. 3 illustrates a data align circuit according to an embodiment.

Referring to FIG. 3, the data align circuit 140 according to an embodiment includes a plurality of N flip-flops 141 to 143. The N flip-flops 141 to 143 may be D-type flip-flops.

The plurality of N flip-flops 141 to 143 may respectively receive the plurality of output data DAT_1D to DAT_ND output from the shift register circuit 110. For example, the N-th output data DAT_ND may be input to the first flip-flop 141, the (N−1)-th output data DAT_(N−1)D may be input to the second flip-flop 142, and the first output data DAT_1D may be input to the N-th flip-flop 143. In addition, the selected clock signal CK_S is commonly applied to the plurality of N flip-flops 141 to 143, such that the plurality of N flip-flops 141 to 143 may operate depending on the selected clock signal CK_S. For example, the selected clock signal CK_S may be applied to the clock terminals of the plurality of N flip-flops 141 to 143.

For example, when the data align circuit 140 is implemented in a Parallel-In to Parallel-Out (PIPO) structure, N output data DAT_1D to DAT_ND may be input in parallel to the plurality of flip-flops 141 to 143, and N parallel data OUT_1 to OUT_N may be output in parallel from the plurality of flip-flops 141 to 143.

The plurality of flip-flops 141 to 143 may receive N output data DAT_1D to DAT_ND and may output N number of parallel data OUT_1 to OUT_N in response to an edge of the selected clock signal CK_S. In this case, since the selected clock signal CK_S is output to have an edge at the second time through the clock selecting circuit 130, the plurality of flip-flops 141 to 143 may output N number of parallel data OUT_1 to OUT_N from N output data DAT_1D to DAT_ND stored in the shift register circuit 110 at the second time. As a result, the data align circuit 140 may output N number of parallel data OUT_1 to OUT_N in which valid data indicated by the selection signal SS starts from the first parallel data OUT_1.

Figure 4:
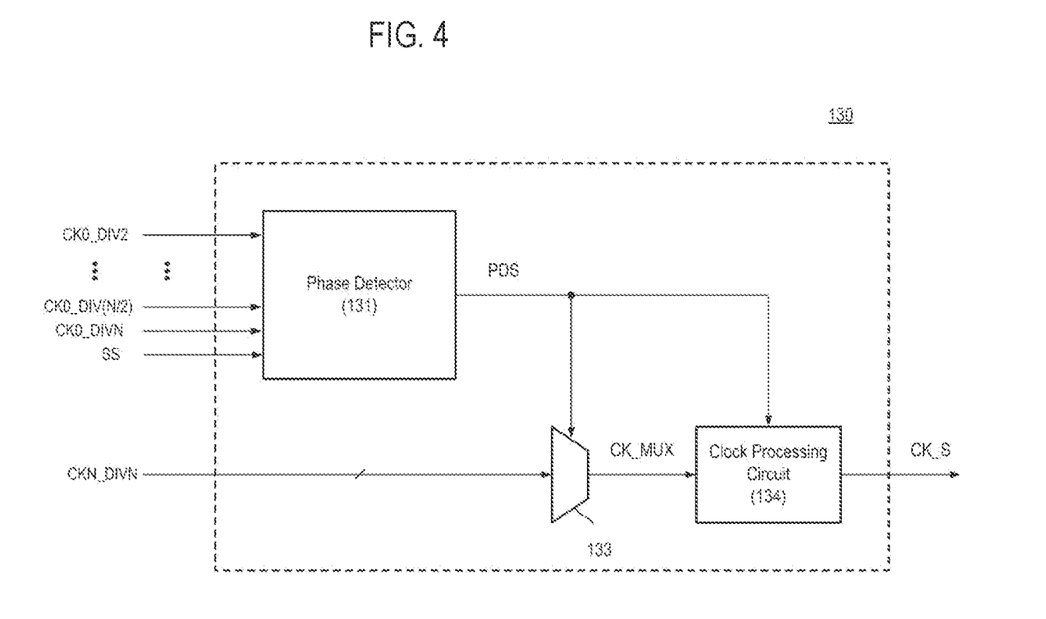
FIG. 4 illustrates a clock selecting circuit according to an embodiment.

FIG. 4 illustrates a clock selecting circuit according to an embodiment.

Referring to FIG. 4, the clock selecting circuit 130 according to an embodiment includes a phase detector 131 (e.g., a phase detector circuit), a multiplexer (mux) 133, and a clock processing circuit 134.

The phase detector 131 may be configured to output a phase detection signal PDS for detecting the first time based on a combination of logic values of a 2-1 clock signal CK0_DIV/N having a phase of 0 degrees among the N second clock signals CKN_DIVN and the one or more third clock signals CK0_DIV2 to CK0_DIV(N/2).

In detail, the phase detector 131 may receive the 2-1 clock signal CK0_DIV/N and the one or more third clock signals CK0_DIV2 to CK0_DIV(N/2) output from the clock divider 120, and the selection signal SS. As described above, the selection signal SS has a specific logic value in the valid period. The phase detector 131 may detect the valid period by using the 2-1 clock signal CK0_DIV/N and the one or more third clock signals CK0_DIV2 to CK0_DIV(N/2). In an embodiment, the 2-1 clock signal CK0_DIV/N and the one or more third clock signals CK0_DIV2 to CK0_DIV(N/2) all have a phase of 0 degree with respect to the first clock signals CK, but have different frequency division ratios. Therefore, the combination of logic values of each of the 2-1 clock signal CK0_DIV/N and the one or more third clock signals CK0_DIV2 to CK0_DIV(N/2) will be defined for each period divided based on the edge of the 3-1 clock signals CK0_DIV(N/2), which is the clock signal having the highest frequency among the 2-1 clock signal CK0_DIV/N and the one or more third clock signals CK0_DIV2 to CK0_DIV(N/2). For example, the combination of logic values may have a size of $\log_2$ N bits. For example, when N=4, the combination of logical values may have 2 bits, that is, '11', '10', '01', and '00'.

The phase detector 131 may generate and output the phase detection signal PDS from the combination of the above-described logical values, based on one combination corresponding to the valid period of the selection signal SS.

The mux 133 may receive N second clock signals CKN_DIVN and may select one of the N second clock signals CKN_DIVN based on the phase detection signal PDS. Each $\log_2$ N bit of the phase detection signal PDS may be defined by corresponding to or being mapped to any one of the N second clock signals CKN_DIVN. The one clock signal selected through the mux 133 may be output as a mux clock signal CK_MUX. Accordingly, switching from one clock signal used before selection to one currently selected clock signal is performed through the mux 133. The one clock signal before and after the selection may have the same or different phases.

Although the N second clock signals CKN_DIVN differ only in phase from each other and all have the same frequency, a change in the frequency of the clock signal may occur due to selection, at least from the point of view of the mux clock signal CK_MUX. In this case, there is no problem in changing the frequency in the direction of decreasing or maintaining, but changing the frequency in the direction of increasing may affect the setup/hold margin of the clock signal. In this case, the frequency change in the direction of increasing may mean that a period between a pulse of the mux clock signal CK_MUX generated by the selection and a pulse generated thereafter is decreased.

The clock processing circuit 134 may remove the edge at the first time included in one clock signal based on the fact that the one clock signal has an edge at the first time. In detail, when the mux clock signal CK_MUX has an edge, that is, a pulse, at a first time at which the selection signal SS is detected, the clock processing circuit 134 may operate to remove the corresponding pulse to generate a clock signal CK_SC (see FIG. 6). When the pulse is removed at the first time, a period in the time domain is relatively ensured between subsequent pulses, so the influence of the frequency change in the direction of increasing due to the selection may be minimized.

Thereafter, the clock processing circuit 134 may output the selected clock signal CK_S by delaying the phase of the clock signal CK_SC from which the edge, that is, the pulse, is removed. In this case, the clock processing circuit 134 may delay the clock signal CK_SC from which the pulse is removed such that the edge of the pulse following the removed pulse corresponds to the second time. For example, the clock processing circuit 134 may output the selected clock signal CK_S by delaying the clock CK_SC from which the pulse is removed by one clock cycle of the first clock signal CK.

Figure 5:
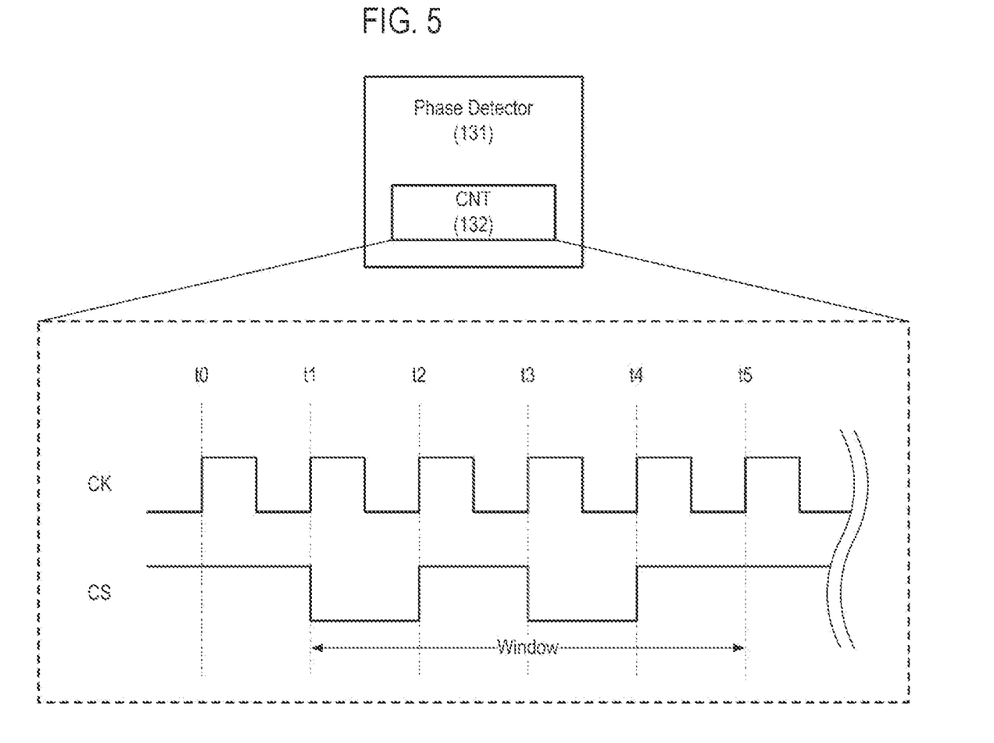
FIG. 5 illustrates a phase detector according to an embodiment.

FIG. 5 illustrates a phase detector according to an embodiment.

Referring to FIG. 5, the phase detector 131 according to an embodiment may include a counter 132 (e.g., a counter circuit).

The counter 132 may be configured to count the valid period of the selection signal SS within N number of cycles of the first clock signal CK. In detail, the counter 132 may count whether the valid period is detected a plurality of times within a window defined by the N number of cycles of the first clock signal CK. For example, in the case of FIG. 5, assuming that N=4, the size of the window may be defined as periods t1 to t5 including four number of cycles of the first clock signal CK. The counter 132 may set the window from period t1 in which the first valid period (e.g., period t1 to t2) from the selection signal SS starts. In the case of FIG. 5, within the window, after the first valid period is detected, a valid period appears again in t3 to t4. The counter 132 may count the number of detections whenever a valid period is detected after the first valid period.

The phase detector 131 may output the phase detection signal PDS with respect to the first detected valid period when the valid period is detected from the counter 132 a plurality of times. In detail, the phase detector 131 outputs the phase detection signal PDS only based on the first valid period counted by the counter 132 and ignores the remaining valid periods. Accordingly, the data align circuit 140 may parallelize the input data DAT corresponding to the N number of cycles of the first clock signal CK without errors.

Figure 6:
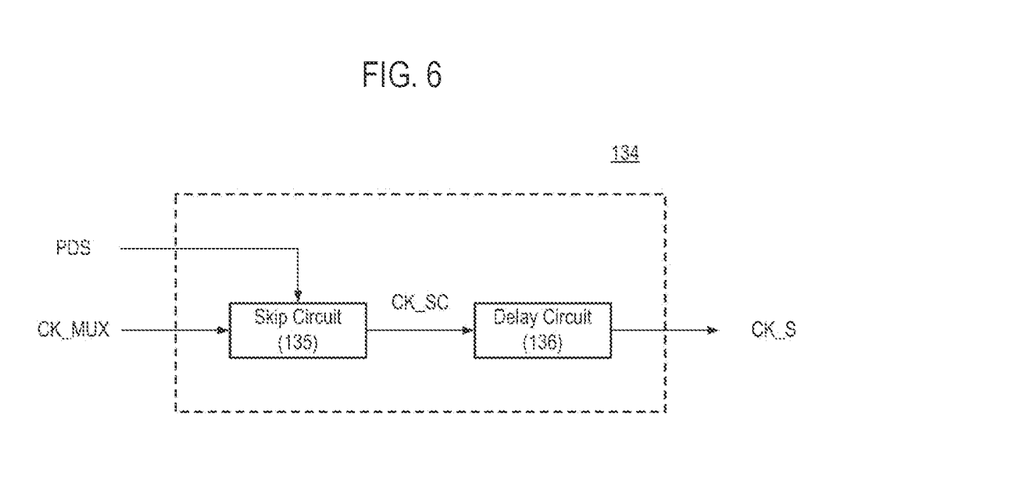
FIG. 6 illustrates a clock processing circuit according to an embodiment.

FIG. 6 illustrates a clock processing circuit according to an embodiment.

Referring to FIG. 6, the clock processing circuit 134 according to an embodiment includes a skip circuit 135, and a delay circuit 136.

The skip circuit 135 may receive the mux clock signal CK_MUX transferred from the mux 133 and the phase detection signal PDS transferred from the phase detector 131. The skip circuit 135 may determine whether an edge exists at a time at which the phase detection signal PDS is changed in the mux clock signal CK_MUX, that is, at a time in which the phase detection signal PDS indicates a changed phase. In detail, the skip circuit 135 may determine whether an edge exists in the mux clock signal CK_MUX at the first time, which is a time at which the valid period of the selection signal SS is detected.

When an edge exists, the skip circuit 135 may skip, that is, remove the pulse defined including the corresponding edge in the mux clock signal CK_MUX, to generate the clock signal CK_SC from which the pulse is removed. The skip circuit 135 may internally generate a skip signal clock for a skip operation when the edge exists. The skip circuit 135 may output the clock signal CK_SC from which the pulse is removed to the delay circuit 136.

The delay circuit 136 may output the selected clock signal CK_S by delaying the phase of the clock signal CK_SC from which the pulse is removed. The delay circuit 136 may delay the clock signal CK_SC from which the pulse is removed such that the edge of the pulse following the pulse removed through the skip circuit 135 corresponds to the second time in the clock signal CK_SC from which the pulse is removed.

As a result, the clock processing circuit 134 may completely remove the pulse generated at the first time by first removing the pulse at the first time from the mux clock signal CK_MUX selected through the phase detection signal PDS. Thereafter, the clock processing circuit 134 delays the clock signal CK_SC from which the pulse is removed such that the data align circuit 140 may correctly parallelize the valid data.

Figure 7:
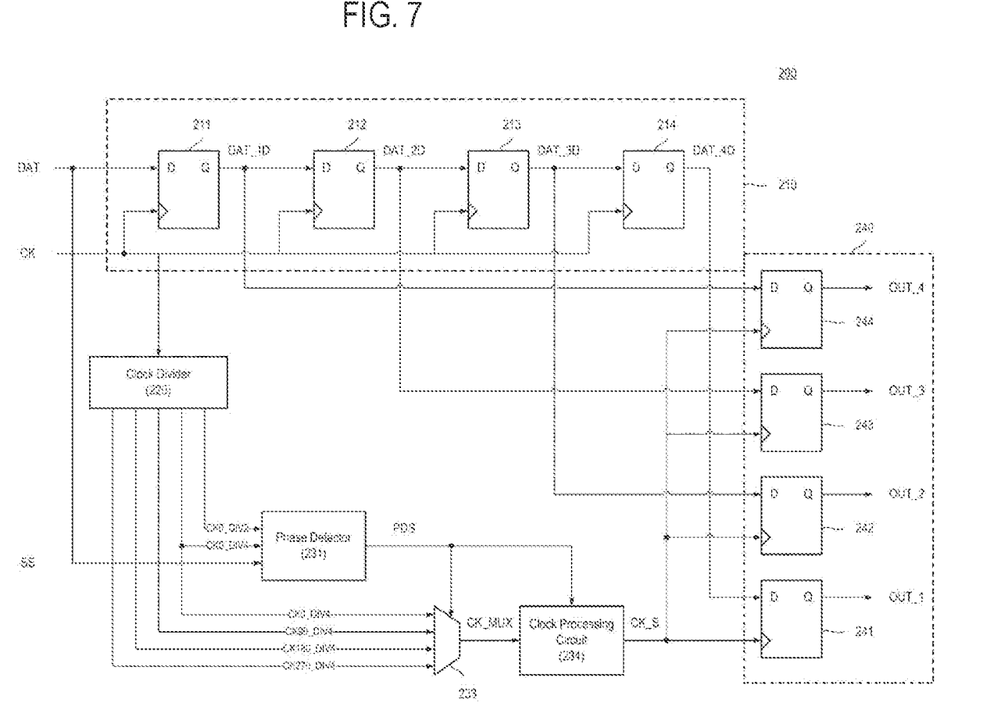
FIG. 7 illustrates a deserializer according to an embodiment.

FIG. 7 illustrates a deserializer 200 implemented according to an embodiment. The structure of the deserializer 200 supports N=4.

Referring to FIG. 7, each of the shift register circuit 210 and the data align circuit 240 included in the deserializer 200 supporting N=4 according to an embodiment includes four flip-flops. The shift register circuit 210 may output four output data DAT1D to DAT4D sequentially delayed from the input data DAT through four flip-flops 211 to 214.

A clock divider 220 may output four second clock signals CK0_DIV4 to CK270_DIV4 having four different phases (e.g., 0 degrees, 90 degrees, 180 degrees, and 270 degrees) from the first clock signal CK, and one third clock signal CK0_DIV2 having a phase of 0 degrees. In this case, the second clock signals CK0_DIV4 to CK270_DIV4 may be generated by dividing the first clock signal CK by 4, and the third clock signal CK0_DIV2 may be generated by dividing the first clock signal CK by 2.

The second clock signal CK0_DIV4 having a phase of 0 degrees, the third clock signal CK0_DIV2, and the selection signal SS may be input to the phase detector 231, and the four second clock signals may be input to a mux 233. The phase detector 231 may output the phase detection signal PDS corresponding to the valid period of the selection signal SS based on a combination of logical values of the second clock signals CK0_DIV4 to CK270_DIV4 and the third clock signal CK0_DIV2. The combination of logic values is $\log_2 N$, which is 2 bits, and the phase detection signal PDS may also have a size of 2 bits.

The mux 233 may output one second clock signal corresponding to the phase detection signal PDS among the four second clock signals CK0_DIV4 to CK270_DIV4 as the mux clock signal CK_MUX. The mux clock signal CK_MUX will be switched at a time at which the phase detection signal PDS is switched, that is, at the first time. In detail, the mux clock signal CK_MUX may be switched to one second clock signal selected from one second clock signal used before switching among the four second clock signals CK0_DIV4 to CK270_DIV4. The frequency of the mux clock signal CK_MUX may vary according to the switching. For example, when the frequency of the mux clock signal CK_MUX becomes greater than a 4-divided frequency, the setup/hold margin of the clock signal may be affected. Accordingly, in an embodiment, the clock processing circuit 234 removes the pulse at the first time at which the phase detection signal PDS is switched from the mux clock signal CK_MUX and delays the clock signal CK_SC from which the pulse is removed, thereby outputting the selected clock signal CK_S.

The data align circuit 240 parallelizes the four output data DAT1D to DAT4D based on the four flip-flops 241 to 244 and the selected clock signal CK_S to output four parallel data OUT_1 to OUT_4. In this case, the parallelized four parallel data OUT_1 to OUT_4 are the correctly parallelized four input data DAT starting from the valid period through the selected clock signal CK_S.

Figure 8:
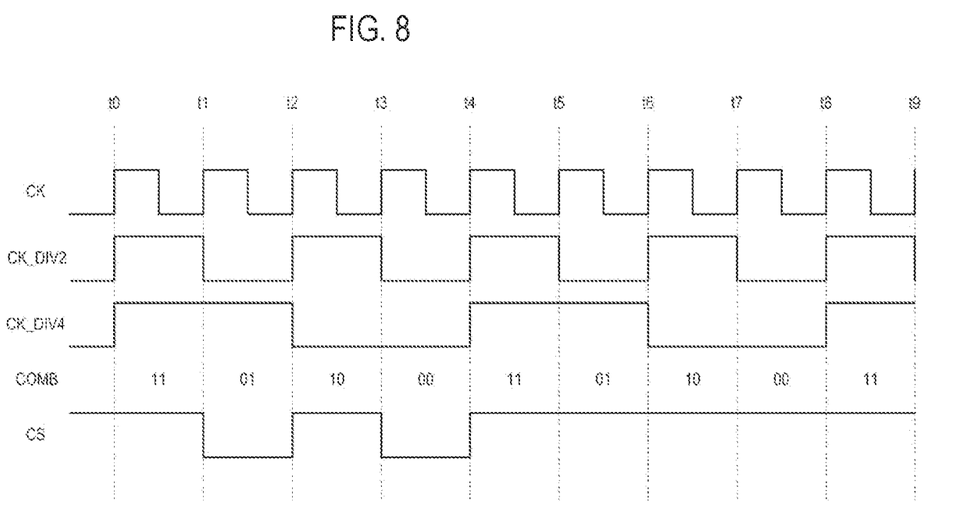
FIG. 8 is a diagram for describing a selection signal detection operation of a deserializer according to an embodiment.
Figure 9:
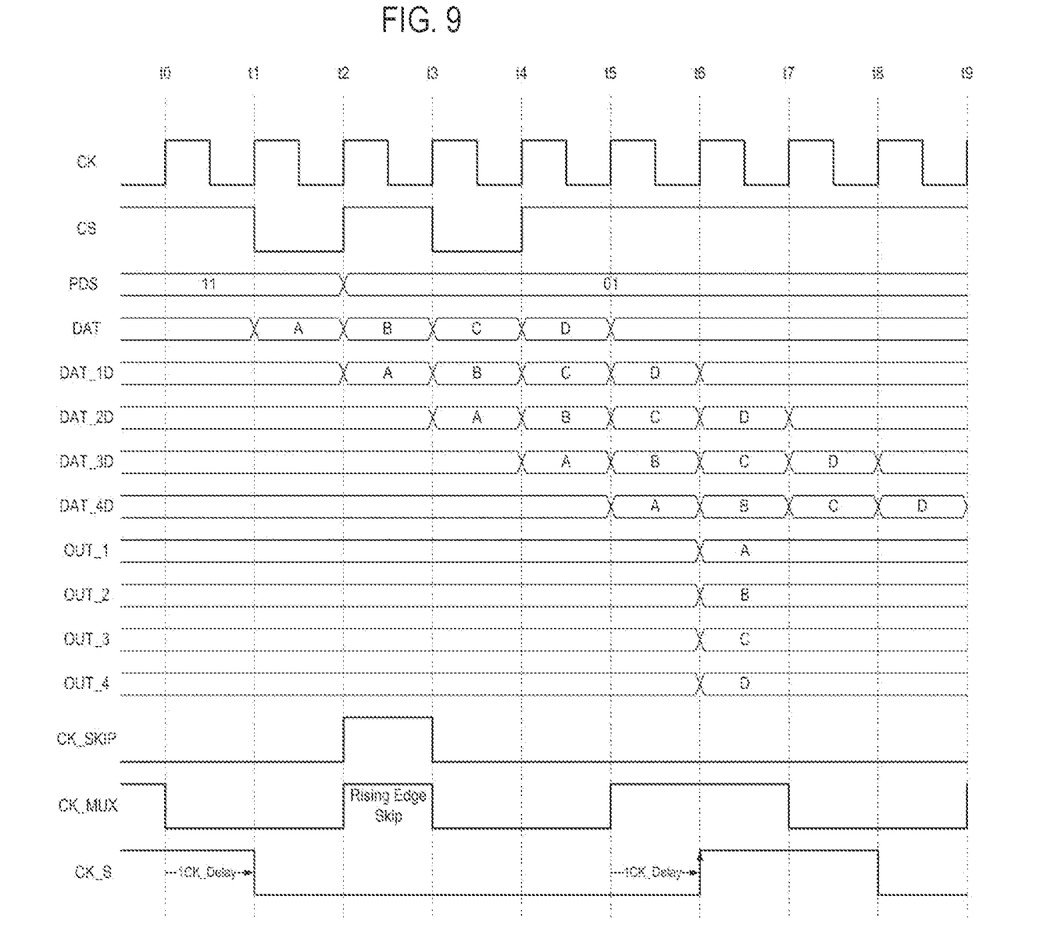
FIG. 9 is a diagram for describing a parallelization operation of a deserializer according to an embodiment.
Figure 10:
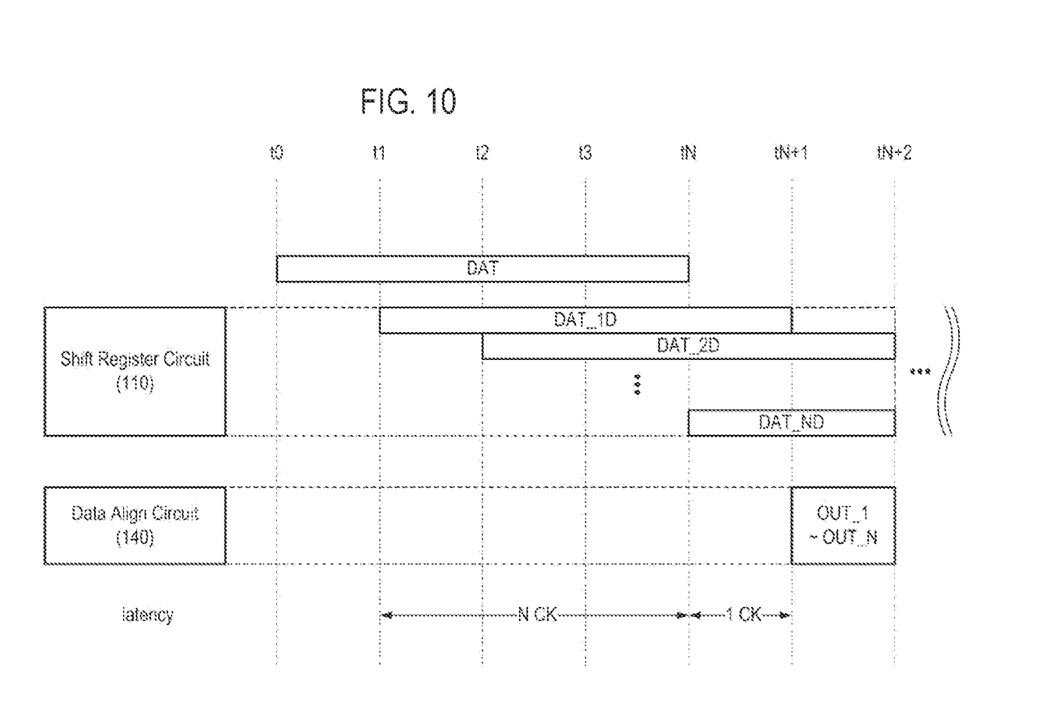
FIG. 10 illustrates a latency of a deserializer according to an embodiment.

FIG. 8 is a diagram for describing a selection signal detection operation of a deserializer according to an embodiment. Hereinafter, although FIGS. 8 to 10 are illustrated based on N=4, embodiments of the present disclosure are not limited thereto.

Referring to FIG. 8, a 2-divided clock signal CK_DIV2 and a 4-divided clock signal CK_DIV4 may be defined based on the first clock signal CK. Assuming that the period between each of times is T and the frequency of the first clock signal CK is 1/T, the 2-divided signal clock signal CK_DIV2 has a frequency of 2/T, and the 4-divided clock signal CK_DIV4 has a frequency of 4/T. Since the divided clock signals have different frequencies, the 2-divided clock signal CK_DIV2 and the 4-divided clock signal CK_DIV4 may have a combination COMB of 2-bit logic values within 4T (e.g., t0 to t3). For example, the combination COMB may sequentially include '11', '01', '10', and '00' within t0 to t3 as illustrated. For example, the '11' logic value may occur when CK_DIV2 and CK_DIV4 are both logic high, the '01' logic value may occur when CK_DIV2 is logic low and CK_DIV4 is logic high, the '10' logic value may occur when CK_DIV2 is logic high and CK_DIV4 is logic low, and the '00' logic value may occur when CK_DIV2 and CK_DIV4 are both logic low.

In an embodiment, the valid period of the selection signal SS corresponds to any one of the above-described combinations COMB. In FIG. 8, a period in which logic '0' appears in the selection signal SS is defined as the valid period. For example, in FIG. 8, the valid period corresponding to t1 to t2 corresponds to '01', and the valid period corresponding to t3 to t4 corresponds to '00'.

As a result, the phase detector 231 may select one combination corresponding to the valid period of the selection signal SS from the combination of logic values of the divided clock signals COMB, and may output the phase detection signal PDS based on the selected combination. According to an embodiment, when a plurality of valid periods are detected within a window (e.g., t1 to t5), the remaining valid periods other than the first detected valid period may be ignored. For example, the phase detector 231 may output the phase detection signal PDS based on a combination corresponding to the first detected valid period of t1 to t2 excluding the valid period of t3 to t4.

FIG. 9 is a diagram for describing a parallelization operation of a deserializer according to an embodiment.

Referring to FIG. 9, the plurality of serial input data DAT having a size corresponding to one first clock signal CK may be input to the deserializer. For example, the input data DAT may include serial data of 'ABCD' from t1 to t5.

The shift register circuit (e.g., 110) will output four output data DAT_1D to DAT_4D while storing and shifting the input data DAT. The first output data DAT_1D may include 'ABCD' from t2 to t6 by being shifted by one clock cycle from the input data DAT, the second output data DAT_2D may include 'ABCD' from t3 to t7 by being shifted by one clock cycle from the first output data DAT_1D, the third output data DAT_3D may include 'ABCD' from t4 to t8 by being shifted by one clock cycle from the second output data DAT_2D, and the fourth output data DAT_4D may include 'ABCD' from t5 to t9 by being shifted by one clock cycle from the third output data DAT_3D.

The phase detector (e.g., 131) may detect the valid period t1 to t2 of the selection signal SS, and may output the switched phase detection signal PDS at the first time t2, which is a detection time. For example, when the combination corresponding to a valid period among combinations of logic values is '00', the phase detection signal PDS will be switched from '11' used before switching to '00'. In addition, the mux 233 will output one second clock signal corresponding to '00' as the mux clock signal CK_MUX.

According to the embodiment, the phase detector may ignore the valid period t3 to t4 detected after the valid period t1 to t2. Accordingly, the phase detection signal PDS may still maintain '00' after t2.

According to the switching, the mux clock signal CK_MUX has a rising edge at the first time t2 and a rising edge at t5, so the period between rising edges becomes three clock cycles of the first clock signal CK. In an embodiment, the mux clock signal CK_MUX has a frequency greater than the 4-divided frequency. Accordingly, the clock processing circuit 234 may detect the rising edge of the mux clock signal CK_MUX at the first time t2 and may skip the pulse based on a skip clock signal CK_SKIP for skipping the pulse including the detected rising edge.

Also, the clock processing circuit 234 may output the selected clock signal CK_S by delaying the clock signal CK_SC from which the pulse is removed by one first clock signal CK. The selected clock signal CK_S has a rising edge at t6.

The parallel circuit 240 may parallelize four output data based on the selected clock signal CK_S and may output four parallel data OUT1 to OUT4. In this case, since the selected clock signal CK_S applied to the parallel circuit 240 has a rising edge at the second time t6 at which shifting and storing of 'A' occur, which is the input data DAT corresponding to the valid period is completed to the fourth output data DAT_4D, which is the last output data, the parallel circuit 240 may sequentially parallelize the four output data stored in the shift register circuit 210 at the second time to output 'ABCD', which is 1:4 parallel data.

FIG. 10 illustrates latency of a deserializer according to an embodiment.

Referring to FIG. 10, when the input data DAT is input to the deserializer according to at least one the above-described embodiments, as a result, the shift register circuit 110 outputs the N output data DAT_1D to DAT_4D sequentially delayed by one clock cycle from the input data DAT, and the data align circuit 140 outputs the parallelized N parallel data OUT_1 to OUT_N.

In this case, due to the operation of the shift register circuit 110, a total of N clock latencies occur. Next, since the data align circuit 140 performs parallelization based on the selection signal SS having a rising edge at tN+1, latency by as much as one clock cycle occurs due to the operation of the data align circuit 140.

As a result, the deserializer may sequentially perform the parallelization, starting with the earliest input data DAT corresponding to the valid period indicated by the selection signal SS, with only a latency of a total of (N+1) clock cycles.

Figure 11:
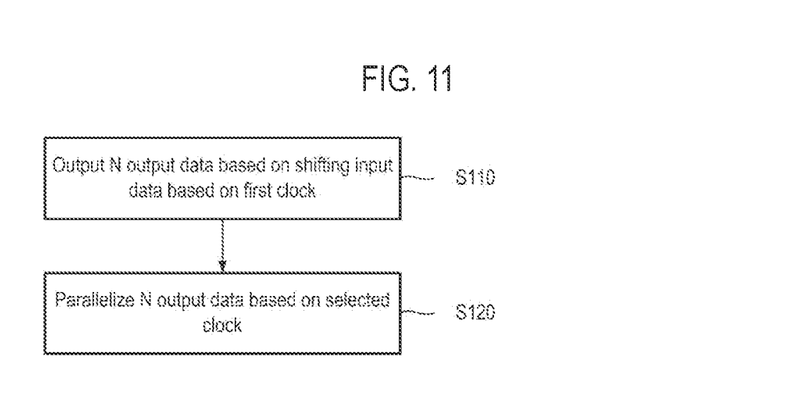
FIG. 11 is a flowchart of a method of operating a deserializer according to an embodiment.

FIG. 11 is a flowchart of a method of operating a deserializer according to an embodiment.

Referring to FIG. 11, in operation S110, the deserializer according to an embodiment outputs N output data by shifting the input data DAT based on the first clock signal CK. In operation S110, the input data DAT may be sequentially shifted in units of one clock cycle of the first clock signal CK.

In operation S120, the deserializer parallelizes N output data based on the selected clock signal CK_S. In this case, the selected clock signal CK_S may be output to have an edge corresponding to the second time after N number of clock cycles of the first clock signal CK have elapsed from the first time at which the valid period is detected in the selection signal SS for selecting the input data DAT, based on the N second clock signals and the one or more third clock signals.

In an embodiment, the operating method may further include outputting the N second clock signals and the one or more third clock signals based on dividing the first clock signal CK, and outputting the phase detection signal PDS for detecting the first time based on a combination of logic values of the 2-1 clock signal CK0_DIV/N having a phase of 0 degrees among the N second clock signals and the one or more third clock signals.

In an embodiment, the outputting of the phase detection signal PDS may include outputting the phase detection signal PDS with respect to the first detected valid period when the valid period is detected a plurality of times within N number of clock cycles of the first clock signals CK. According to the embodiment, the outputting of the phase detection signal PDS may further include counting valid periods within N number of clock cycles of the first clock signal CK.

In an embodiment, the operating method may further include selecting one clock signal among N second clock signals based on the phase detection signal PDS, removing an edge of the first time included in the one clock signal based on the fact that the one clock signal has the edge at the first time, delaying the phase of the one clock signal by one clock cycle of the first clock signal CK to output the selected clock signal CK_S.

Figure 12:
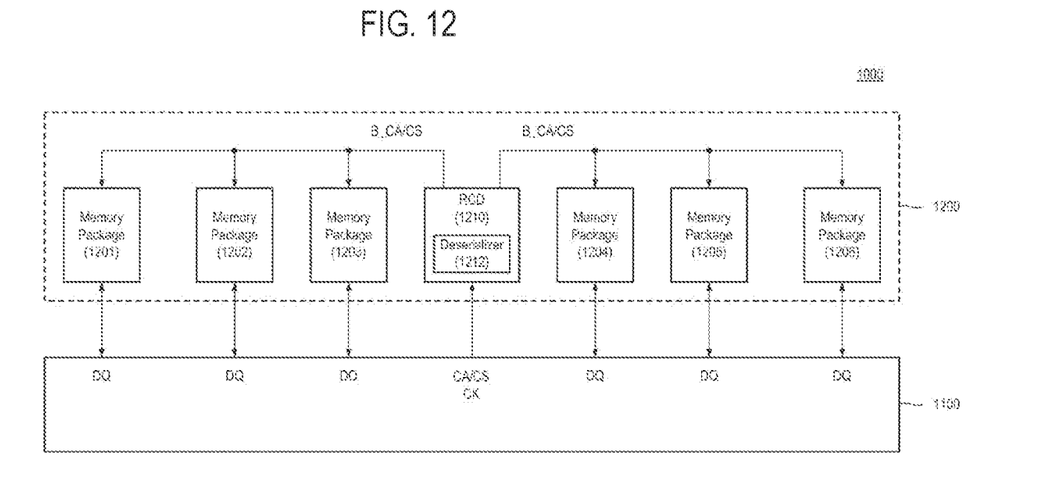
FIG. 12 illustrates a memory system according to an embodiment.

FIG. 12 illustrates a memory system according to an embodiment.

Referring to FIG. 12, a memory system 1000 according to an embodiment includes a processor 1100 and a memory module 1200.

The processor 1100 may store data in the memory module 1200 or may read data stored in the memory module 1200. The processor 1100 may transmit input data CA/CS and the first clock signal CK to the memory module 1200 for a data storage or read operation. In this case, the input data CA/CS may include the above-described command/address and the selection signal CS.

The memory module 1200 may be controlled by the processor 1100. For example, the memory module 1200 may be provided in a form factor such as a dual in-line memory module (DIMM). For example, the memory module 1200 may be used as a buffer memory, a main memory, a working memory, or a cache memory of the memory system 1000 or the processor 1100.

In an embodiment, the memory module 1200 includes a plurality of memory packages 1201 to 1206 and a Registered Clock Driver (RCD) 1210.

Each of the plurality of memory packages 1201 to 1206 is connected to the processor 1100 through data lines, and may exchange a DQ signal DQ with the processor 1100 in response to a signal from the RCD 1210. For example, each of the plurality of memory packages 1201 to 1206 may include a plurality of memory devices. For example, each of the memory devices may include a volatile memory, such as a static RAM (SRAM), a DRAM, or a synchronous DRAM (SDRAM), or a nonvolatile memory, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), or a thyristor RAM (TRAM).

The RCD 1210 may receive the input data CA/CS and the first clock signal CK from the processor 1100, may buffer the input data CA/CS to generate buffered input data B_CA/CS, and may transfer the buffered input data B_CA/CS to the plurality of memory packages 1201 to 1206. The buffering operation may be performed for each of the plurality of memory packages 1201 to 1206.

The RCD 1210 may include a deserializer 1212 according to the above-described embodiments. The deserializer 1212 may be implemented by the deserializer 100. For example, the deserializer 1212 may be configured to output the selected clock signal CK_S having an edge corresponding to the second time after N number of clock cycles of the first clock signal CK have elapsed from the first time at which the valid period is detected in the selection signal CS included in the input data CA/CS, and to parallelize the input data CA/CS based on the selected clock signal CK_S to output N number of parallel data. In such case, the RCD 1210 may perform buffering based on the N parallel data. A more detailed description of the RCD 1210 will be described below with reference to FIG. 14.

Figure 13:
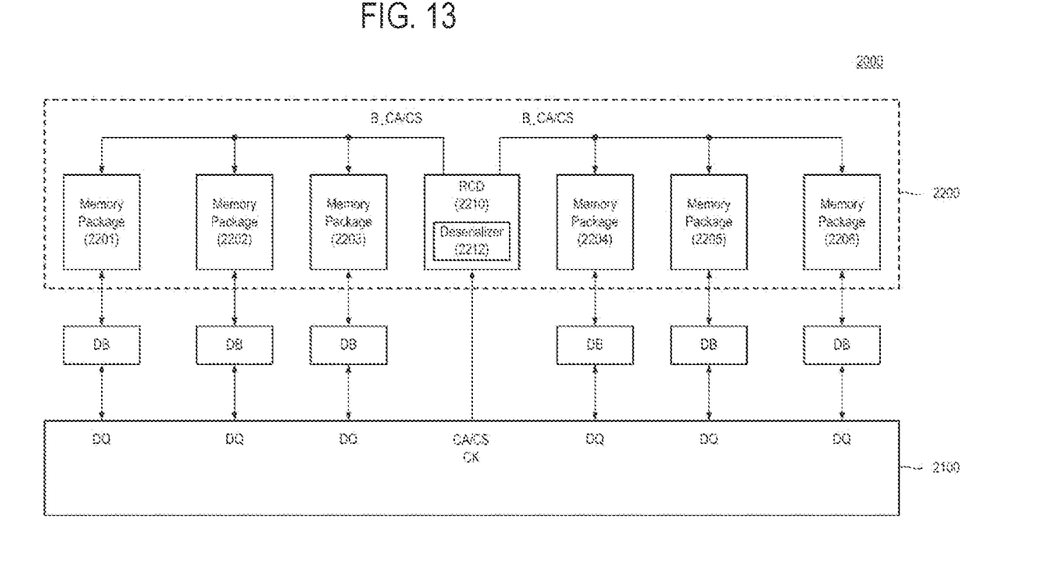
FIG. 13 illustrates a memory system according to an embodiment.

FIG. 13 illustrates a memory system according to an embodiment.

Referring to FIG. 13, a memory system 2000 according to an embodiment includes a plurality of buffers DB in addition to a processor 2100 and a memory module 2200. For example, the memory module 2200 may be a Load Reduced DIMM (LRDIMM).

The plurality of buffers DB may exchange data with the processor 2100 and a plurality of memory packages 2201 to 2206 through data lines DQ. The plurality of buffers DB may buffer the DQ signal DQ (and a DQS signal). The plurality of buffers DB may transmit buffered DQ signals to a plurality of memory packages.

According to an embodiment, the RCD 2210 generates a buffer command for controlling the plurality of buffers DB and transfers the generated buffer command to the plurality of buffers DB. The RCD 2210 may output the parallelized N number of parallel data based on a deserializer 2212 and may perform buffering based on the N number of parallel data. The deserializer 2212 may be implemented by the deserializer 100.

Figure 14:
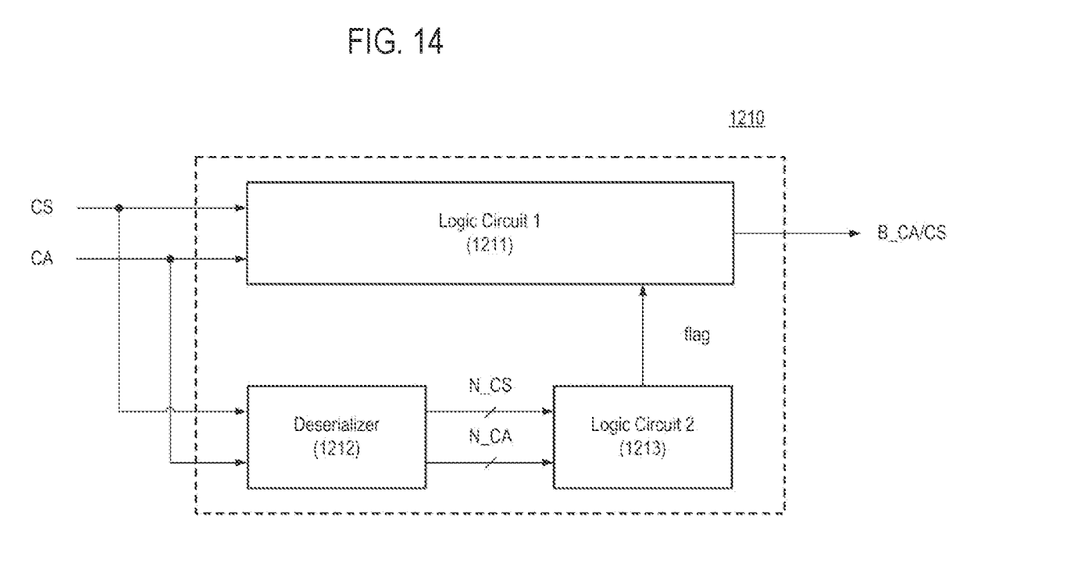
FIG. 14 illustrates a registered clock driver (RCD) according to an embodiment.

FIG. 14 illustrates an RCD according to an embodiment.

Referring to FIG. 14, the RCD 1210 according to an embodiment includes a first logic circuit 1211, the deserializer 1212, and a second logic circuit 1213.

The first logic circuit 1211 may be configured to receive the input data CS and CA from the processor 1100 and to perform buffering on the input data CS and CA. For example, the first logic circuit 1211 may operate according to a first operating frequency. The first logic circuit 1211 may output buffered input data B_CS/CA.

The deserializer 1212 is implemented according to the above-described embodiments to output N number of the parallel data N_CS and N_CA that are sequentially parallelized starting from the input data CS and CA corresponding to the valid period of the selection signal CS included in the input data CS and CA. For example, the deserializer 1212 may output parallelized N selection signals N_CS and N command/address data N_CA.

The second logic circuit 1213 is connected to an output terminal of the deserializer 1212 and may receive the N selection signals N_CS and the N command/address data N_CA. The second logic circuit 1213 may output a flag signal 'flag' to be used for the operation of the first logic circuit 1211 based on the N selection signals N_CS and the N command/address data N_CA.

In an embodiment, the first logic circuit 1211 operates at or based on a first operating frequency and the second logic circuit 1213 operates at or based on a second operating frequency that is less than the first operating frequency.

According to at least of the above-described embodiments, the RCD 1210 of the present disclosure may operate through the deserializer 1212 capable of outputting the valid data indicated by the selection signal CS in parallel starting from the first valid data in the input data CS and CA. Therefore, the RCD 1210 of the present disclosure does not require an operation for aligning circuits for buffering (e.g., the first logic circuit 1211 and the second logic circuit 1213), so complexity may be reduced. Also, the RCD 1210 may operate with minimal latency (e.g., the (N+1) latency described above).

According to an embodiment of the present disclosure, a deserializer and a memory module capable of sequentially parallelizing valid data may be provided.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A deserializer comprising:
   a shift register circuit configured to output N output data by shifting input data based on a first clock signal, where 'N' is a natural number;
   a clock divider configured to output N second clock signals N-divided from the first clock signal and having N phases different from each other, and to output one or more third clock signals divided to have a frequency less than that of the second clock signals;
   a clock selecting circuit configured to output a selected clock signal having an edge corresponding to a second time after N number of clock cycles of the first clock signal have elapsed from a first time at which a valid period is detected in a selection signal for selecting the input data, based on the N second clock signals and the one or more third clock signals; and
   a data align circuit configured to parallelize the N output data based on the selected clock signal.

2. The deserializer of claim 1, wherein the selection signal is a Chip Select (CS) signal.

3. The deserializer of claim 1, wherein each of the shift register circuit and the data align circuit includes N flip-flops.

4. The standard cell of claim 1, wherein the one or more third clock signals include a 2-divided clock signal of the first clock signal to an N/2-divided clock signal of the first clock signal.

5. The deserializer of claim 1, wherein the valid period corresponds to a logical value of the selection signal indicating when valid data starts from the input data.

6. The deserializer of claim 1, wherein the clock selecting circuit includes a phase detector configured to output a phase detection signal for detecting the first time based on a combination of logic values represented by a 2-1 clock signal having a phase of 0 degrees among the N second clock signals and the one or more third clock signals.

7. The deserializer of claim 6, wherein the combination of the logic values has a size of $\log_2 N$ bits.

8. The deserializer of claim 6, wherein the phase detector includes a counter configured to count the valid period of the selection signal within the N number of clock cycles of the first clock signal, and
   wherein the phase detector outputs the phase detection signal with respect to the valid period which is first detected when the valid period is detected a plurality of times from the counter.

9. The deserializer of claim 6, wherein the clock selecting circuit further includes:
   a multiplexer configured to select one clock signal of the N second clock signals based on the phase detection signal; and
   a clock processing circuit configured to output the selected clock signal by removing a pulse of the edge of the first time included in the one clock signal based on the one clock signal having an edge at the first time and delaying a phase of the one clock signal by one clock cycle of the first clock signal.

10. The deserializer of claim 4, wherein each of the 2-divided clock signal to the N/2 divided clock signal has a phase of 0 degrees with respect to the first clock signal.

11. A method of operating a deserializer, the method comprising:
    outputting N output data by shifting input data based on a first clock signal, where 'N' is a natural number; and
    parallelizing the N output data based on a selected clock signal, and
    wherein the selected clock signal is output to have an edge corresponding to a second time after N number of clock cycles of the first clock signal have elapsed from a first time at which a valid period is detected in a selection signal for selecting the input data, based on N second clock signals and one or more third clock signals, and
    wherein the N second clock signals are N-divided from the first clock signal and have N phases different from each other, and the one or more third clock signals are divided to have a frequency less than that of the second clock signals.

12. The method of claim 11, further comprising:
    outputting the N second clock signals and the one or more third clock signals based on dividing the first clock signal; and outputting a phase detection signal for detecting the first time based on a combination of logic values of a 2-1 clock signal having a phase of 0 degrees among the N second clock signals and the one or more third clock signals.

13. The method of claim 12, wherein the outputting of the phase detection signal includes outputting the phase detection signal with respect to the valid period which is first detected when the valid period is detected a plurality of times in the N number of clock cycles of the first clock signal.

14. The method of claim 12, further comprising:
selecting one clock signal of the N second clock signals based on the phase detection signal;
removing the edge of the first time included in the one clock signal based on the one clock signal having an edge at the first time; and
delaying a phase of the one clock signal by one clock cycle of the first clock signal to output the selected clock signal.

15. A memory module comprising:
a plurality of memory packages; and
a Registered Clock Driver (RCD) configured to receive input data and a first clock signal from a processor, to perform buffering on the input data to generate buffered data and to transfer the buffered data to the plurality of memory packages, and
wherein the RCD comprises:
a deserializer configured to output a selected clock signal having an edge corresponding to a second time after N number of clock cycles of the first clock signal have elapsed from a first time at which a valid period is detected in a selection signal included in the input data, and to parallelize the input data based on the selected clock signal to output N parallel data;
a first logic circuit configured to perform the buffering on the input data; and
a second logic circuit configured to perform the buffering on the N parallel data,
where 'N' is a natural number.

16. The memory module of claim 15, wherein the deserializer outputs the selection signal based on N second clock signals N-divided from the first clock signal and having N phases different from each other, and one or more third clock signals divided from the first clock signal to have a frequency less than that of the second clock signals.

17. The memory module of claim 15, wherein the second logic circuit operates based on an operating frequency less than that of the first logic circuit.

18. The memory module of claim 16, wherein the deserializer comprises:
a shift register circuit configured to output N output data by shifting the input data based on a first clock signal;
a clock divider configured to output the N second clock signals and the one or more third clock signals from the first clock signal;
a clock selecting circuit configured to output the selected clock signal based on the N second clock signals and the one or more third clock signals; and
a data parallel circuit configured to output the N parallel data based on the selected clock signal.

19. The memory module of claim 15, further comprising:
a plurality of buffers coupled to the processor and the plurality of memory packages, configured to receive a DQ signal from the processor and to buffer the DQ signal.

20. The memory module of claim 15, wherein the selection signal is a Chip Select (CS) signal.

* * * * *